United States Patent
Serkh et al.

(10) Patent No.: US 9,759,266 B1
(45) Date of Patent: Sep. 12, 2017

(54) ISOLATING DECOUPLER

(71) Applicant: GATES CORPORATION, Denver, CO (US)

(72) Inventors: Alexander Serkh, Troy, MI (US); Yahya Hodjat, Oxford, MI (US); Ilya Kleyman, Bloomfield Hills, MI (US); Essie Rahdar, Costa Mesa, CA (US)

(73) Assignee: Gates Corporation, Denver, CO (US)

( * ) Notice: Subject to any disclaimer, the term of this patent is extended or adjusted under 35 U.S.C. 154(b) by 0 days.

(21) Appl. No.: 15/154,713

(22) Filed: May 13, 2016

(51) Int. Cl.
*F16D 7/02* (2006.01)
*F16D 41/20* (2006.01)
*F16H 55/36* (2006.01)

(52) U.S. Cl.
CPC ........... *F16D 7/022* (2013.01); *F16D 41/206* (2013.01); *F16H 55/36* (2013.01); *F16D 2250/0076* (2013.01); *F16D 2300/22* (2013.01); *F16H 2055/366* (2013.01)

(58) Field of Classification Search
None
See application file for complete search history.

(56) References Cited

U.S. PATENT DOCUMENTS

| 8,931,610 B2 | 1/2015 | Serkh | |
| 9,033,832 B1 * | 5/2015 | Serkh | F16H 55/36 |
| | | | 474/70 |
| 2007/0254756 A1 * | 11/2007 | Kawamoto | F16F 15/1216 |
| | | | 474/70 |
| 2015/0345575 A1 * | 12/2015 | Antchak | F16D 43/24 |
| | | | 474/94 |

FOREIGN PATENT DOCUMENTS

WO 2007121582 A1 11/2007

* cited by examiner

*Primary Examiner* — Mark Manley
(74) *Attorney, Agent, or Firm* — Jeffrey A. Thurnau, Esq.; Paul N. Dunlap, Esq.

(57) ABSTRACT

An isolating decoupler comprising a shaft, a pulley journalled to the shaft, a torsion spring, the torsion spring comprising a flat surface planar in a plane normal to the rotation axis A-A on each end of the torsion spring, a one-way clutch engaged between the torsion spring and the shaft, a weld bead joining a torsion spring end to the one-way clutch, and a weld bead joining the other torsion spring end to the pulley.

11 Claims, 6 Drawing Sheets

US 9,759,266 B1

ISOLATING DECOUPLER

FIELD OF THE INVENTION

The invention relates to an isolating decoupler, and more particularly, to an isolating decoupler comprising a weld joining a torsion spring end to the one-way clutch, and a weld joining the other torsion spring end to the pulley.

BACKGROUND OF THE INVENTION

Diesel engine use for passenger car applications is increasing due to the benefit of better fuel economy. Further, gasoline engines are increasing compression ratios to improve the fuel efficiency. As a result, diesel and gasoline engine accessory drive systems have to overcome the vibrations of greater magnitude from crankshafts due to above mentioned changes in engines.

Due to increased crankshaft vibration plus high acceleration/deceleration rates and high alternator inertia the engine accessory drive system is often experiencing belt chirp noise due to belt slip. This will also reduce the belt operating life.

Crankshaft isolators/decouplers and alternator decouplers/isolators have been widely used for engines with high angular vibration to filter out vibration in engine operation speed range and to also control belt chirp.

Representative of the art is U.S. Pat. No. 8,931,610 which discloses an isolator decoupler comprising a pulley, a shaft, the pulley journalled to the shaft on a low friction bushing, a spring carrier, the pulley journalled to the spring carrier on a low friction bushing, the spring carrier journalled to the shaft on a low friction bushing, a torsion spring coupled between the pulley and the spring carrier, a one way clutch spring frictionally engaged with the shaft, the one way clutch spring coupled to the spring carrier, the one way clutch spring is disposed radially inward of the torsion spring, and the pulley temporarily engagable with an end of the one way clutch spring whereby the frictional engagement of the one way clutch spring with the shaft is temporarily diminished.

What is needed is an isolating decoupler comprising a weld joining a torsion spring end to the one-way clutch, and a weld joining the other torsion spring end to the pulley. The present invention meets this need.

SUMMARY OF THE INVENTION

The primary aspect of the invention is an isolating decoupler comprising a weld joining a torsion spring end to the one-way clutch, and a weld joining the other torsion spring end to the pulley.

Other aspects of the invention will be pointed out or made obvious by the following description of the invention and the accompanying drawings.

The invention comprises an isolating decoupler comprising a shaft, a pulley journalled to the shaft, a torsion spring, the torsion spring comprising a flat surface planar in a plane normal to the rotation axis A-A on each end of the torsion spring, a one-way clutch engaged between the torsion spring and the shaft, a weld bead joining a torsion spring end to the one-way clutch, and a weld bead joining the other torsion spring end to the pulley.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
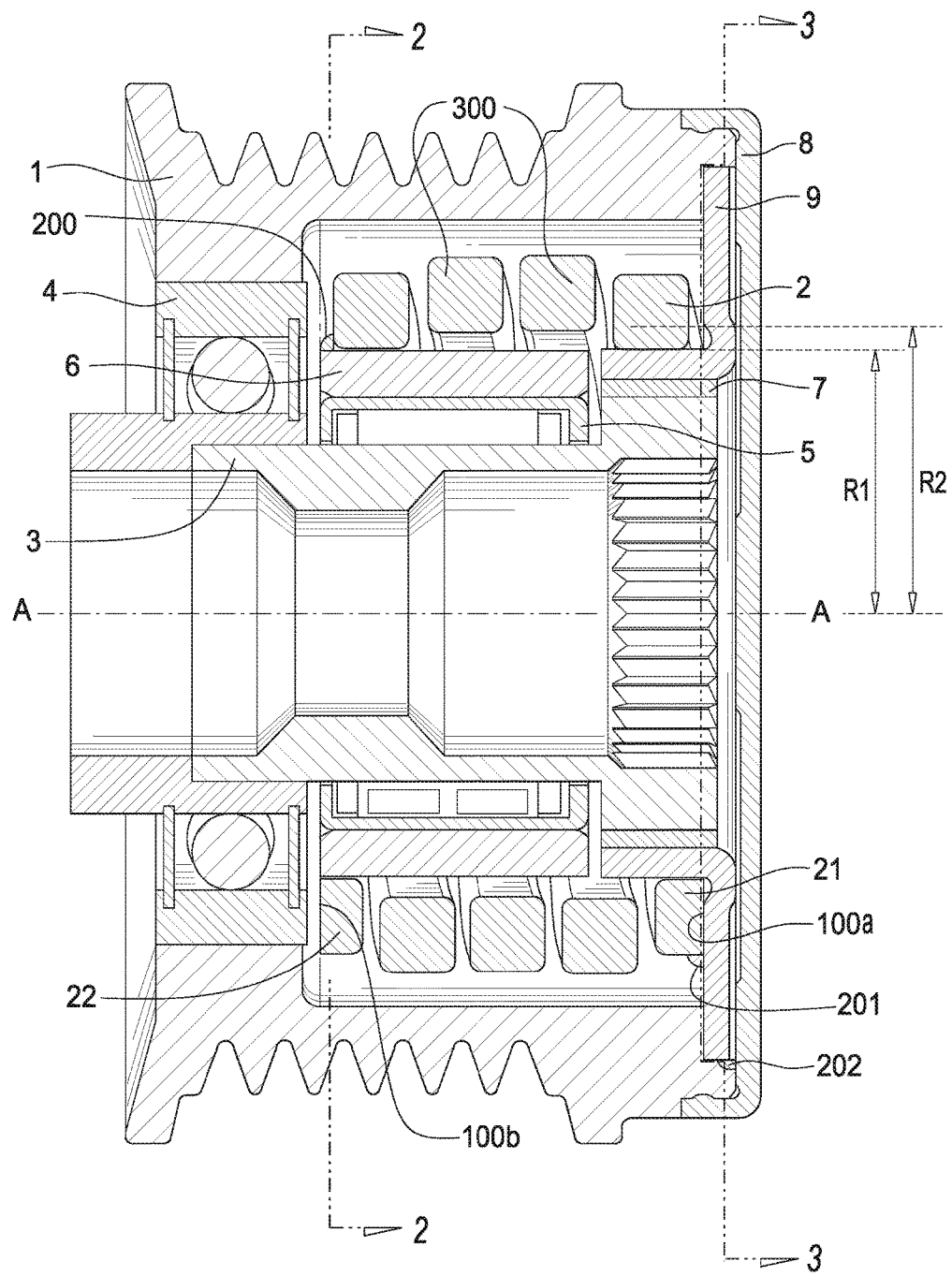
FIG. 1 is a cross-sectional view of the inventive device.

FIG. 1 is a cross-sectional view of the inventive device. The alternator isolating decoupler consists of pulley 1, torsion spring 2, shaft 3, bearing 4, roller one-way clutch 5, clutch carrier 6, journal bearing 7, cover 8, and spring retainer 9.

Pulley 1 is installed on shaft 3 via bearing 4 and 7. One-way clutch 5 is pressed into clutch carrier 6. Torsion spring 2 connects clutch carrier 6 to pulley 1. Torsion spring 2 is connected to clutch carrier 6 and spring retainer 9 by welding. The spring retainer 9 is connected to the pulley 1 by welding. Before assembly torsion spring 2 can freely rotate in loading direction in relationship to both clutch carrier 6 and pulley 1.

Use of laser welding to join the components makes it unnecessary to use a filler rod. In laser welding the parent metal of each portion being welded liquefies and combines to form a single weld bead. In an alternate embodiment a suitable filler rod material may be used in the weld process to form the weld bead and thereby join the components. Example processes include TIG or MIG welding.

When load is applied by a belt (not shown) to pulley 1, spring 2 is loaded in the winding direction by its end attached to spring retainer 9. The other end of torsion spring 2 which is attached to clutch carrier 6 resists the loading because one-way clutch 5 is locked on the shaft 3.

At a predetermined torque spring 2 will radially contract thereby taking on a uniform shape whereby each of the spring coils have approximately the same radius. Transition coils 300 contract to form a continuous helical structure wound about clutch carrier 6. All coils are typically engaged with carrier 6 and spring retainer 9. The predetermined torque magnitude depends on the application and can be, for example, about 20 Nm.

Transition coils 300 have a radius R2. Each end of the torsion spring 21, 22 has a radius R1. Radius R2 is greater than radius R1. Numeric values provided in this specification are examples only and are not intended to limit the scope of the invention.

Spring 2 has a coil at each end 21, 22. Each end coil 21, 22 has a smaller radius than the transition coils 300 in order to have frictional contact with clutch carrier 6 and spring retainer 9. Both end coils 21, 22 are ground flat as shown in FIG. 1, see surface 100.

Figure 2:
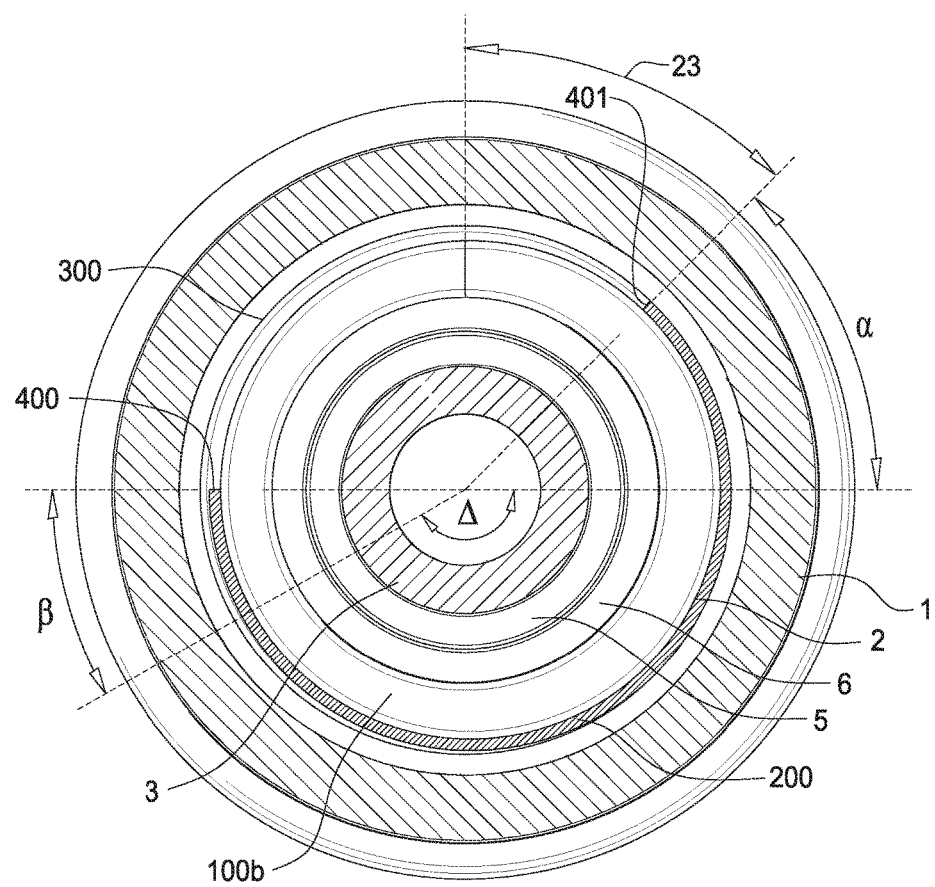
FIG. 2 is a section of FIG. 1.

FIG. 2 is a section of FIG. 1. Surface 100a of end 22 extends between position 400 and position 401. There is a like flat surface 100b on end 21. Flat surface 100a provides a circular edge by which spring end 22 is welded to carrier 6. Flat surface 100b provides a circular edge by which end 21 is welded to retainer 9. Each flat surface 100a and 100b is planar in a plane normal to the axis of rotation A-A.

Weld bead 200 starts at position 400 at the end of the coil and stops at position 401, which is the beginning of the active coils of spring 2. Bead 200 welds spring 2 to carrier 6. The circumferential length of bead 200 is less than 360 degrees.

The active coil origin is defined by the point wherein the spring coil is not in contact with any other component of the device, namely position 401. Position 400 may be located at any position within arc angle β from position 401. Position 401 may be located at any position within arc angle α. A coil portion 23 starting at 401 and ending prior to transition coil 300 may be used to prevent dynamic loading in multiple directions as the torsion spring 2 winds and unwinds to its rest position during operation of the device. The coil portion 23 inner diameter will be in contact with with either spring retainer 9 or clutch carrier 6. The welded portion end 22 of torsion spring 2 will therefore not flex. The length of protective coil portion 23 determines the dynamic load that the welded coil will experience during operation. The longer protective coil portion 23 is, the less loaded the welded portion of spring 2, that is, the portion of the spring in contact with weld 200. Therefore, the length of coil portion 23 may be adjusted based on the dynamic needs of the particular application. Weld portion 200 may become a shorter length which in turn makes the protective coil longer which reduces the dynamic load experienced by the weld 200.

By adjusting the angles α and β, and thereby the length of the spring protective coil 23, the device can be adjusted to have a specified load on weld 200. Adjustability allows a user to compensate for manufacturing variability resulting from part tolerancing. This in turn adds more varied functionality to the device when designing and manufacturing the device for a given system. In certain applications both α and β equal zero.

In the following table are examples of how the protective coil portion 23 length can be varied. The minimum value for β would be 0°, namely, weld 200 starts at the end of the spring. The maximum value for α would be 360° if it is a closed coil spring and weld 200 extends the circumferential length of the whole coil. The protective coil 23 length values in the table are examples for a spring with a coil cross section of 4.6 mm×4.6 mm. If the cross section changes then the protective coil 23 length will change for given values of α and β.

| β (°) | α (°) | Protective Coil (23) Length | Comments |
|---|---|---|---|
| 45 | 135 | 0.25 | |
| 0 | 90 | 0.50 | Weld 200 from end of spring |
| 0 | 45 | 0.75 | Shorter length of weld 200 |

The torsional loading on spring end 22 starts at position 400 at the end of weld 200. Angle α is equal to or greater than zero. Angle β is equal to or greater than zero. Angle Δ is disposed between angle α and angle β. Angle Δ is in the range of 90 degrees to 140 degrees. The total circumferential length of weld bead 200 is therefore: α+β+Δ.

Figure 3:
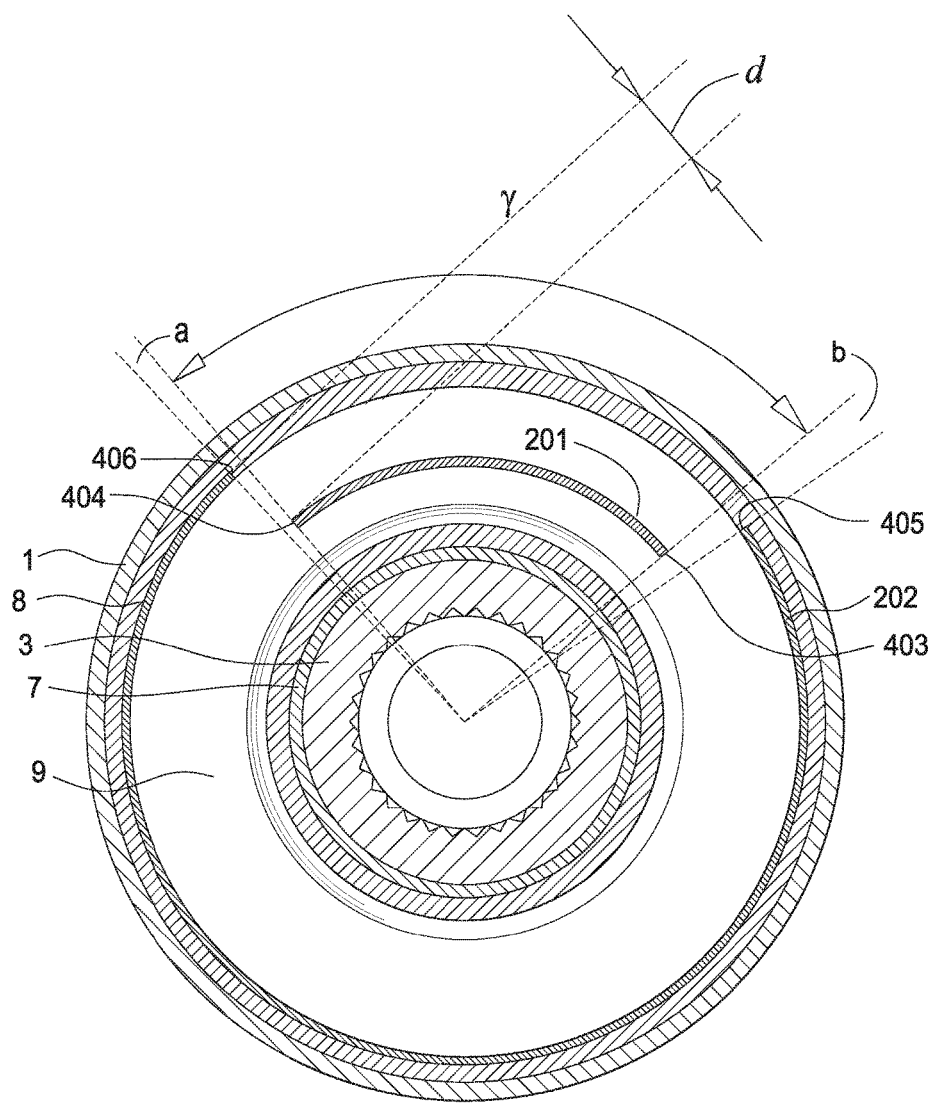
FIG. 3 is a section of FIG. 1.

FIG. 3 is a section of FIG. 1. Weld bead 201 welds spring retainer 9 to spring end 21. Weld 201 is within a portion bounded by an angle γ between ends 403 and 404. Weld bead 202 is between spring retainer 9 and pulley 1 between ends 405 and 406.

Weld 201 creates a heat affected zone (HAZ). Weld 202 is circumferentially external to the portion bounded by angle γ to avoid compromising and possibly degrading the HAZ from weld 201 with the welding operation for weld 202. Weld 201 angle γ is in the range of 60 degrees to 120 degrees. The total combined circumferential length of bead 202 and bead 201 are less than 360 degrees.

End 406 stops short of end 404 by leaving a circumferential gap "a" of approximately 5 degrees, although end 406 may slightly radially overlap end 404 depending upon the radial distance "d" between 404 and 406 such that the HAZ is not affected. End 405 stops short of end 403 by leaving a gap "b" of approximately 5 degrees, although there can be a slight radial overlap between end 405 and end 403 depending upon the radial distance "d" between 403 and 405 such that the HAZ is not affected.

Figure 4:
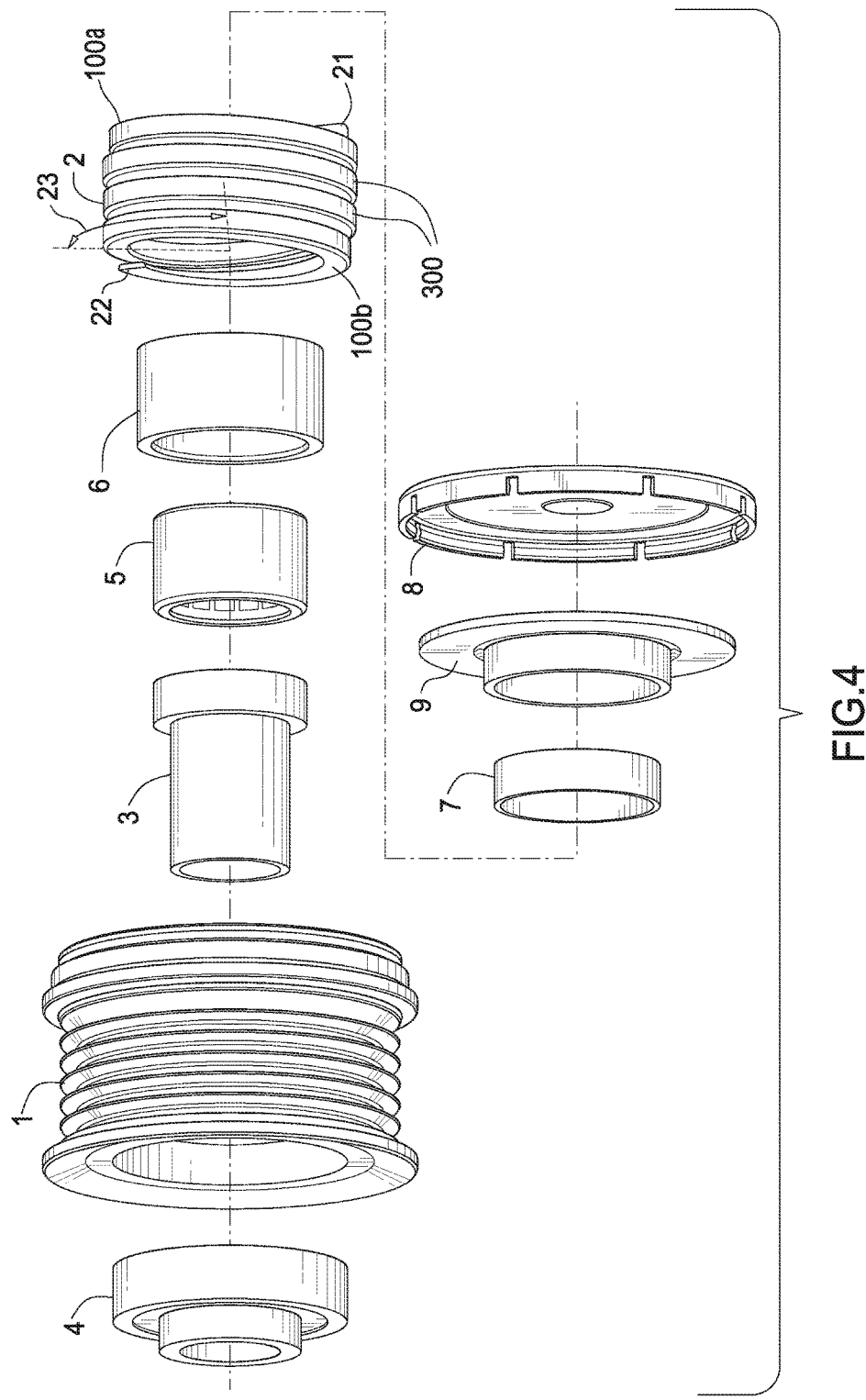
FIG. 4 is an exploded view of the inventive device.

FIG. 4 is an exploded view of the inventive device. Cover 8 is snap fit to pulley 1. Retainer 6 is press fit to one-way clutch 5.

Figure 5:
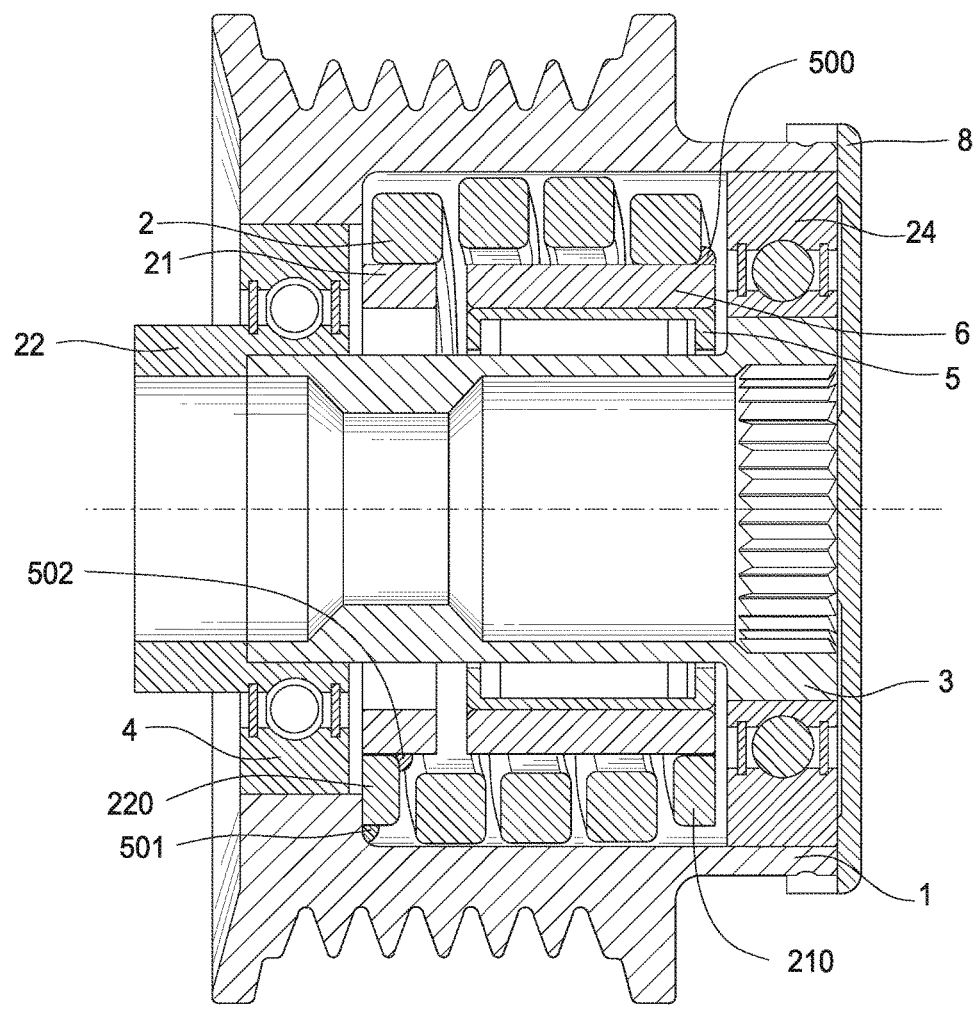
FIG. 5 is a cross-sectional view of an alternate embodiment.

FIG. 5 is a cross-sectional view of an alternate embodiment. In this alternate embodiment spring 2 is welded to both spring retainer ring 21 with bead 502 and to pulley 1 with bead 501. The design allows for a more robust design using two bearings 22, 24. In particular, weld bead 500 welds spring end 210 to carrier 6. Weld bead 501 welds end 220 to pulley 1. Weld bead 502 welds spring retainer ring to end 220. Ring 21 is radially inboard of torsion spring 2.

Except as otherwise set forth in this Figure, the flat ends of spring 20 are prepared as described in the other figures in this specification.

Figure 6:
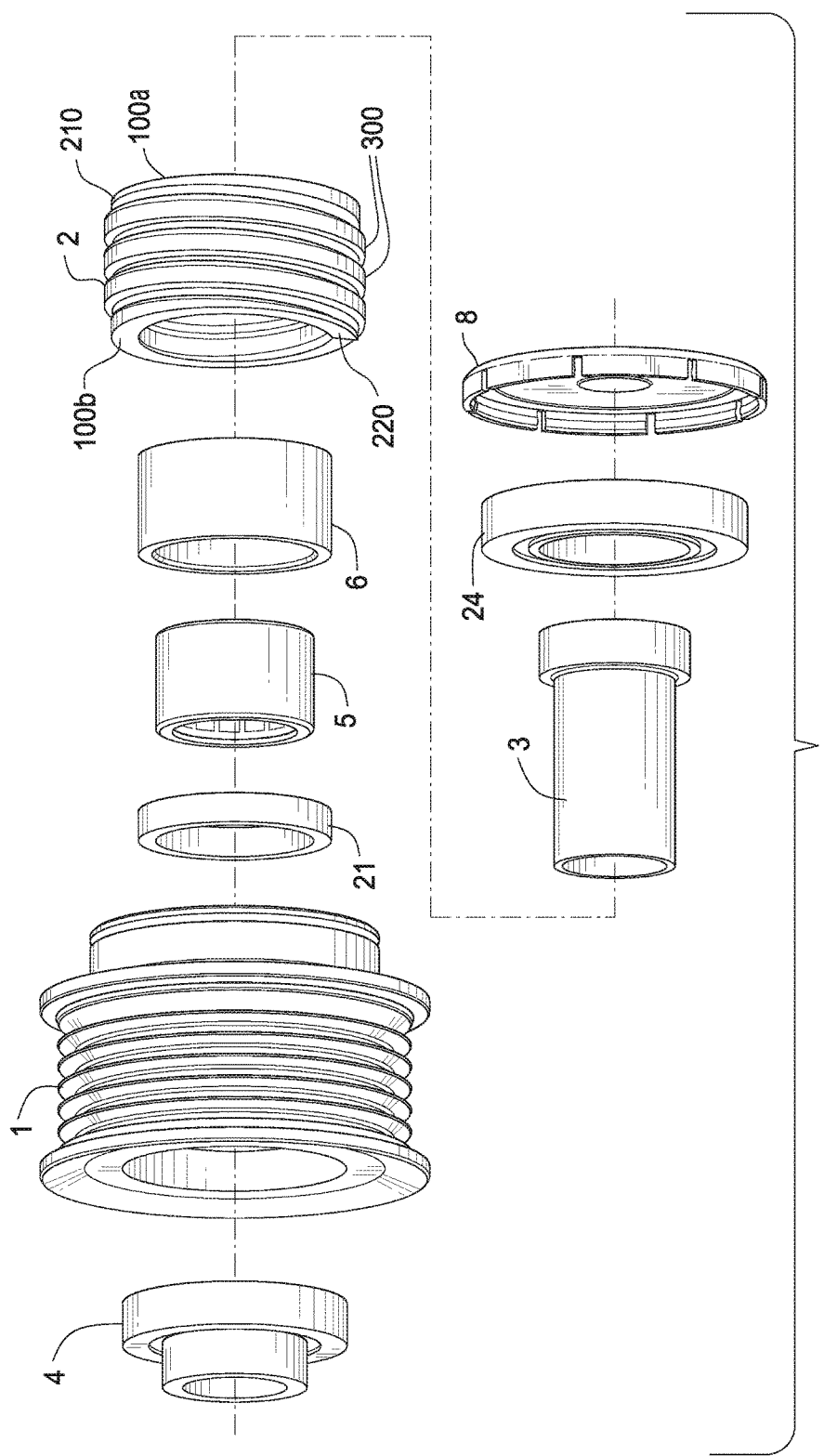
FIG. 6 is an exploded view of the alternate embodiment in FIG. 5.

FIG. 6 is an exploded view of the alternate embodiment in FIG. 5.

Although forms of the invention have been described herein, it will be obvious to those skilled in the art that variations may be made in the construction and relation of parts without departing from the spirit and scope of the invention described herein.

We claim:

1. An isolating decoupler comprising: a shaft; a pulley journalled to the shaft; a torsion spring, the torsion spring comprising a flat surface planar in a plane normal to the rotation axis A-A on each end of the torsion spring; a one-way clutch engaged between the torsion spring and the shaft; a weld bead directly joining a torsion spring end to the one-way clutch; and a weld bead directly joining an other torsion spring end to the pulley.

2. The isolating decoupler as in claim 1, wherein the pulley is journalled to the shaft with a bearing.

3. The isolating decoupler as in claim 1 further comprising:
a clutch carrier engaged to the one-way clutch; and
the torsion spring end is welded to the clutch carrier.

4. The isolating decoupler as in claim 1 further comprising:
a spring retainer welded to the pulley; and
the other torsion spring end is welded to the spring retainer.

5. The isolating decoupler as in claim 1 further comprising:
a ring disposed radially inboard of the torsion spring;
the other torsion spring end welded to the ring; and
the torsion spring is welded to the pulley.

6. The isolating decoupler as in claim 1, wherein each flat surface extends circumferentially through an angle less than 360 degrees.

7. The isolating decoupler as in claim 1, wherein the length of the weld bead joining the torsion spring end to the one-way clutch comprises portions having angular lengths α and β and Δ and having a total angular length α+β+Δ, wherein α is adjacent an active torsion spring coil, β is adjacent a torsion spring end and Δ is between α and β.

8. The isolating decoupler as in claim 7, wherein the length of the weld bead joining the torsion spring end to the one-way clutch is less than 360° in length.

9. The isolating decoupler as in claim 1, wherein the length of the weld bead joining the other torsion spring end to the pulley is less than 360° in length.

10. The isolating decoupler as in claim 4, wherein:
the spring retainer is welded to the pulley; and
a heat affected zone of the spring retainer weld to the pulley does not radially overlap with a heat affected zone of the weld between the other torsion spring end and the spring retainer.

11. The isolating decoupler as in claim 1, wherein the torsion spring comprises a protective coil portion disposed between a transition coil and an end of the weld bead joining the torsion spring end to the one-way clutch.

* * * * *